（12）United States Patent
Wan et al.

(10) Patent No.: US 12,509,128 B2
(45) Date of Patent: Dec. 30, 2025

(54) CONTROL METHOD FOR TRAIN TO ENTER EMERGENCY TRACTION MODE AND TRAIN

(71) Applicant: BYD COMPANY LIMITED, Guangdong (CN)

(72) Inventors: Qiang Wan, Shenzhen (CN); Zhicheng Tan, Shenzhen (CN); Hao Lu, Shenzhen (CN); Lu Wang, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 49 days.

(21) Appl. No.: 18/614,866

(22) Filed: Mar. 25, 2024

(65) Prior Publication Data

US 2024/0227872 A1  Jul. 11, 2024

Related U.S. Application Data

(63) Continuation of application No. PCT/CN2022/128202, filed on Oct. 28, 2022.

(30) Foreign Application Priority Data

Dec. 24, 2021 (CN) .......................... 202111601817.0

(51) Int. Cl.
*B61C 17/00* (2006.01)
*B60T 7/12* (2006.01)
*B60T 8/17* (2006.01)

(52) U.S. Cl.
CPC .............. *B61C 17/00* (2013.01); *B60T 7/126* (2013.01); *B60T 8/1705* (2013.01)

(58) Field of Classification Search
CPC .......... B60T 8/1705; B60T 7/12; B60T 7/126; B61C 17/00; B61L 15/0018; Y02T 10/72
(Continued)

(56) References Cited

U.S. PATENT DOCUMENTS 11,912,082 B1 * 2/2024 Bailey .................... B60T 8/885
12,145,557 B1 * 11/2024 Bailey .................... B60T 7/20
(Continued)

FOREIGN PATENT DOCUMENTS

CN   102267449 A   12/2011
CN   105459989 A   4/2016
(Continued)

OTHER PUBLICATIONS

International Search Report and Written Opinion of PCT application No. PCT/CN2022/128202 dated Jan. 16, 2023.

*Primary Examiner* — Logan M Kraft
*Assistant Examiner* — Johnny H Hoang
(74) *Attorney, Agent, or Firm* — Calfee, Halter & Griswold LLP

(57) ABSTRACT

A control method for a train to enter an emergency traction mode is provided. The control method for a train to enter an emergency traction mode is applicable to a traction control system of a train. The method includes the following steps: It is detected whether current emergency traction information satisfies a condition of entering an emergency traction mode. When the current emergency traction information satisfies the condition of entering the emergency traction mode, the train is controlled to enter the emergency traction mode. A hard-wired signal sent by a driver controller is received, and a corresponding operation is performed according to a type of the hard-wired signal.

15 Claims, 2 Drawing Sheets

(58) Field of Classification Search
USPC .......................................... 701/19–20, 71–92
See application file for complete search history.

(56) References Cited

U.S. PATENT DOCUMENTS

| | | | |
|---|---|---|---|
| 2018/0141452 A1* | 5/2018 | Hourtane | ................ B60L 53/32 |
| 2019/0291584 A1 | 9/2019 | Ren et al. | |
| 2023/0236604 A1* | 7/2023 | Frick | ................... G05D 1/0246 |
| | | | 701/23 |
| 2024/0235206 A1* | 7/2024 | Preindl | ................... H02M 1/44 |

FOREIGN PATENT DOCUMENTS

| | | |
|---|---|---|
| CN | 106428038 A | 2/2017 |
| CN | 109050546 A | 12/2018 |
| CN | 109572643 A | 4/2019 |
| CN | 110803148 A | 2/2020 |
| EP | 0465707 A1 | 1/1992 |
| KR | 20120032719 A | 4/2012 |

\* cited by examiner

CONTROL METHOD FOR TRAIN TO ENTER EMERGENCY TRACTION MODE AND TRAIN

CROSS-REFERENCE TO RELATED APPLICATION

The present disclosure is a bypass continuation application of PCT International Application No. PCT/CN2022/128202, filed on Oct. 28, 2022, which claims priority to and benefits of Chinese Patent Application No. 202111601817.0, filed on Dec. 24, 2021. The entire contents of the above-referenced applications are incorporated herein by reference.

FIELD

The present disclosure relates to the field of rail transit technologies, and more specifically, to a control method for a train to enter an emergency traction mode and a train.

BACKGROUND

A conventional traction and braking control system for a rail transit train connects intelligent units distributed throughout the train, such as a traction control system and a braking control system, into a train network through a multi-functional vehicle bus. A train network control system exchanges information with connected subsystems through the vehicle bus. In the conventional art, when the network control system is faulty, an emergency traction apparatus is started. The traction apparatus controls the train to enter an emergency traction mode. Such a method requires to configure the emergency traction apparatus in the train, which increases production and development costs. In addition, after the emergency traction apparatus fails or malfunctions, emergency traction of the train will fail, and the train cannot brake again.

SUMMARY

To resolve at least one of the foregoing problems, the present disclosure is provided. According to an aspect of the present disclosure, a control method for a train to enter an emergency traction mode is provided, applicable to a traction control system of a train. The method includes the following steps:

It is detected whether current emergency traction information satisfies a condition of entering an emergency traction mode.

When the current emergency traction information satisfies the condition of entering the emergency traction mode, the train is controlled to enter the emergency traction mode.

A hard-wired signal sent by a driver controller is received, and a corresponding operation is performed according to a type of the hard-wired signal.

In an embodiment of the present disclosure, the current emergency traction information includes:

an emergency traction hard-wired signal;
a rotation speed of a motor; and
a hard-wired signal from the driver controller.

In an embodiment of the present disclosure, the hard-wired signal from the driver controller includes a non-traction hard-wired signal. That it is detected whether current emergency traction information satisfies a condition of entering an emergency traction mode includes the following steps:

It is detected whether the emergency traction hard-wired signal is effective.

The motor is adjusted when the emergency traction hard-wired signal is effective, to reduce torque of the motor to 0.

It is detected whether the rotation speed of the motor is less than or equal to a preset threshold.

When the rotation speed of the motor is less than or equal to the preset threshold, it is detected whether the hard-wired signal from the driver controller is the non-traction hard-wired signal. The condition of entering the emergency traction mode is satisfied if the hard-wired signal from the driver controller is the non-traction hard-wired signal.

In an embodiment of the present disclosure, the non-traction hard-wired signal includes at least one of a braking hard-wired signal and a coasting hard-wired signal.

In an embodiment of the present disclosure, a type of the hard-wired signal from the driver controller includes at least one of the following: an emergency traction hard-wired signal, a key hard-wired signal, a direction hard-wired signal, and a traction hard-wired signal.

In an embodiment of the present disclosure, that the corresponding operation is performed according to the type of the hard-wired signal includes the following step:

When the hard-wired signal is the traction hard-wired signal and the emergency traction hard-wired signal, if both the traction hard-wired signal and the emergency traction hard-wired signal are effective, the train is towed according to a preset load and a preset grade.

In an embodiment of the present disclosure, the driver controller includes a front driver controller and a rear driver controller.

That the corresponding operation is performed according to the type of the hard-wired signal includes the following steps:

When the hard-wired signal includes the key hard-wired signal and the direction hard-wired signal, it is determined whether the key hard-wired signal is from the front driver controller.

Traction is performed according to an orientation of the front and the direction hard-wired signal if the key hard-wired signal is from the front driver controller. Otherwise, traction is performed according to an orientation of the rear and the direction hard-wired signal.

In an embodiment of the present disclosure, the traction control system includes a traction inverter.

According to another aspect of the present disclosure, a control method for a train to enter an emergency traction mode is provided. The method includes the following steps:

It is detected whether current emergency traction information satisfies a condition of entering an emergency traction mode.

When the current emergency traction information satisfies the condition of entering the emergency traction mode, a train is controlled to enter the emergency traction mode.

In an embodiment of the present disclosure, the current emergency traction information includes an emergency traction hard-wired signal. That it is detected whether current emergency traction information satisfies the condition of entering the emergency traction mode includes the following steps:

When the emergency traction hard-wired signal is effective, a braking control system is controlled to enter the emergency traction mode.

When the emergency traction hard-wired signal is effective, a traction control system is controlled to enter the emergency traction mode.

In an embodiment of the present disclosure, the current emergency traction information further includes a rotation speed of a motor and a hard-wired signal from a driver controller. Before the traction control system is controlled to enter the emergency traction mode, the method further includes the following steps:

The motor is adjusted when the emergency traction hard-wired signal is effective, to reduce torque of the motor to 0.

When it is detected that the rotation speed of the motor is less than or equal to a preset threshold, and the hard-wired signal from the driver controller is a non-traction hard-wired signal, the traction control system is controlled to enter the emergency traction mode.

In an embodiment of the present disclosure, the non-traction hard-wired signal includes at least one of a braking hard-wired signal and a coasting hard-wired signal.

In an embodiment of the present disclosure, after the train is controlled to enter the emergency traction mode, the method further includes the following steps:

A hard-wired signal sent by the driver controller is received.

A corresponding operation is performed according to a type of the hard-wired signal.

In an embodiment of the present disclosure, the type of the hard-wired signal from the driver controller includes an emergency traction hard-wired signal and a traction hard-wired signal. That the corresponding operation is performed according to the type of the hard-wired signal includes the following step:

When the hard-wired signal is the traction hard-wired signal and the emergency traction hard-wired signal, if both the traction hard-wired signal and the emergency traction hard-wired signal are effective, the traction control system is controlled to tow the train according to a preset load and a preset grade.

In an embodiment of the present disclosure, the type of the hard-wired signal from the driver controller includes a key hard-wired signal and a direction hard-wired signal. That the corresponding operation is performed according to the type of the hard-wired signal includes the following steps:

When the hard-wired signal includes the key hard-wired signal and the direction hard-wired signal, it is determined whether the key hard-wired signal is from the front driver controller.

If the key hard-wired signal is from the front driver controller, the traction control system is controlled to perform traction according to an orientation of the front and the direction hard-wired signal. Otherwise, the traction control system is controlled to perform traction according to an orientation of the rear and the direction hard-wired signal.

In an embodiment of the present disclosure, the type of the hard-wired signal from the driver controller includes an emergency traction hard-wired signal and a braking hard-wired signal. That the corresponding operation is performed according to the type of the hard-wired signal includes the following step:

When both the braking hard-wired signal and the emergency traction hard-wired signal are effective, the braking control system is controlled to perform braking according to a preset load and a preset grade.

According to still another aspect of the present disclosure, a train is provided. The train includes a traction inverter, a driver controller, and a braking controller.

The traction inverter is configured to:

detect whether current emergency traction information satisfies a condition of entering an emergency traction mode;

control, when the current emergency traction information satisfies the condition of entering the emergency traction mode, the train to enter the emergency traction mode; and receive a hard-wired signal sent by the driver controller, and perform a corresponding operation according to a type of the hard-wired signal.

The braking controller is configured to:

collect an emergency traction hard-wired signal from the driver controller; and enter the emergency traction mode when the emergency traction hard-wired signal is effective.

The driver controller includes a front driver controller and a rear driver controller.

In an embodiment of the present disclosure, the current emergency traction information includes the emergency traction hard-wired signal, a rotation speed of a motor, and a hard-wired signal from the driver controller. The traction control system detects whether the current emergency traction information satisfies the condition of entering the emergency traction mode and is specifically configured to:

adjust the motor when the emergency traction hard-wired signal is effective, to reduce torque of the motor to 0; and enter the emergency traction mode when detecting that the rotation speed of the motor is less than or equal to a preset threshold, and the hard-wired signal from the driver controller is a non-traction hard-wired signal.

The non-traction hard-wired signal includes at least one of a braking hard-wired signal and a coasting hard-wired signal.

In an embodiment of the present disclosure, the type of the hard-wired signal from the driver controller includes an emergency traction hard-wired signal, a traction hard-wired signal, a key hard-wired signal, and a direction hard-wired signal. The traction control system performs the corresponding operation according to the type of the hard-wired signal and is specifically configured to:

tow, when the hard-wired signal is the traction hard-wired signal and the emergency traction hard-wired signal, the train according to a preset load and a preset grade if both the traction hard-wired signal and the emergency traction hard-wired signal are effective;

determine, when the hard-wired signal includes the key hard-wired signal and the direction hard-wired signal, whether the key hard-wired signal is from the front driver controller; and perform traction according to an orientation of the front and the direction hard-wired signal if the key hard-wired signal is from the front driver controller; otherwise, perform traction according to an orientation of the rear and the direction hard-wired signal.

In an embodiment of the present disclosure, the type of the hard-wired signal from the driver controller includes an emergency traction hard-wired signal and a braking hard-wired signal. The braking control system is further configured to:

perform braking according to a preset load and a preset grade when both the braking hard-wired signal and the emergency traction hard-wired signal are effective.

In the control method for a train to enter an emergency traction mode according to the present disclosure, when the current emergency traction information satisfies the condition of entering the emergency traction mode, the train is controlled to enter the emergency traction mode, and then, the corresponding operation is performed according to the type of the hard-wired signal from the driver controller. There is no need to arrange an emergency traction apparatus, which reduces the production costs of the train and avoids the problem that the train cannot perform emergency traction after the emergency traction apparatus fails or malfunctions. The present disclosure can effectively improve the applicability of a hard-wired control-based emergency traction circuit.

In addition, in the control method for a train to enter an emergency traction mode according to the present disclosure, the emergency traction hard-wired signal from the driver controller is collected. Then, the emergency traction mode is entered according to the effectiveness of the emergency traction hard-wired signal. After the emergency traction mode is entered, braking or non-braking is performed according to the level of the braking hard-wired signal sent by the driver controller, which can avoid the problem that the vehicle cannot brake after the emergency traction apparatus fails or malfunctions.

BRIEF DESCRIPTION OF THE DRAWINGS

Through a more detailed description of embodiments of the present disclosure in combination with the accompanying drawings, the above and other objectives, features and advantages of the present disclosure are more obvious. The accompanying drawings are used to provide a further understanding of embodiments of the present disclosure, constitute a part of this specification, and are used, together with the embodiments of the present disclosure, to explain the present disclosure, but do not constitute limitations to the present disclosure. In the drawings, same reference numerals generally represent same components or steps.

DETAILED DESCRIPTION

Figure 1:
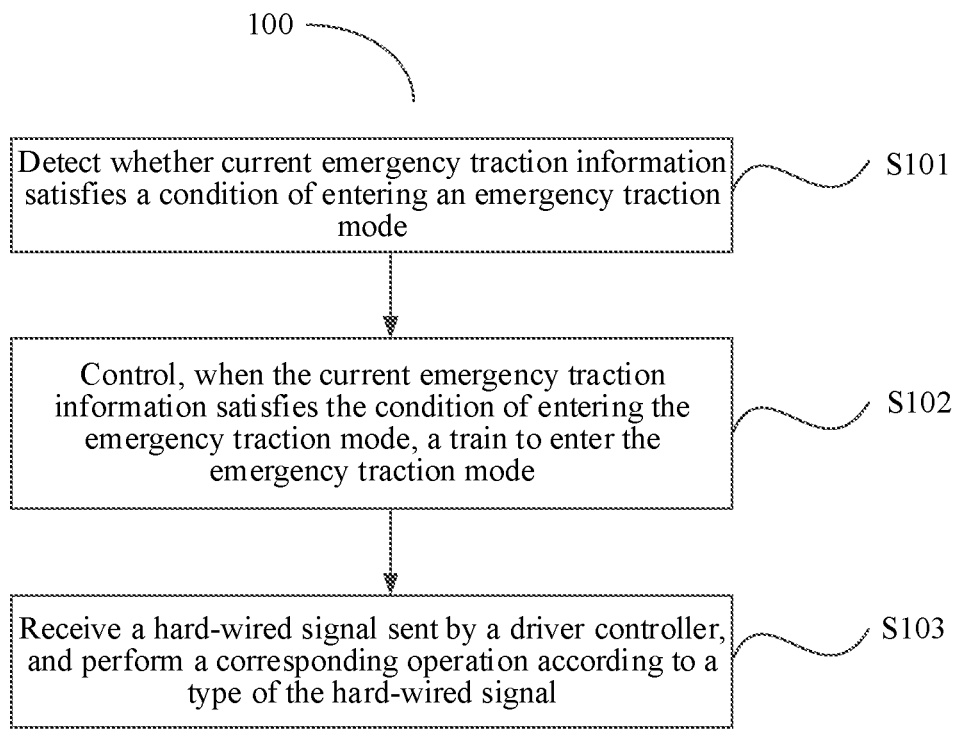
FIG. 1 is a schematic flowchart of a control method for a train to enter an emergency traction mode according to an embodiment of the present disclosure.

To make the objectives, technical solutions, and advantages of the present disclosure more obvious, exemplary embodiments according to the present disclosure are described in detail below with reference to the accompanying drawings. Apparently, the described embodiments are merely some but not all of the embodiments of the present disclosure. It should be understood that, the present disclosure is not limited by the exemplary embodiments described herein. All other embodiments obtained by a person skilled in the art based on the embodiments of the present disclosure described in the present disclosure without creative efforts shall fall within the protection scope of the present disclosure.

Based on the foregoing technical problems, the present disclosure provides a control method for a train to enter an emergency traction mode, applicable to a traction control system of a train. The method includes the following steps: It is detected whether current emergency traction information satisfies a condition of entering an emergency traction mode. When the current emergency traction information satisfies the condition of entering the emergency traction mode, the train is controlled to enter the emergency traction mode. A hard-wired signal from a driver controller is collected, and a corresponding operation is performed according to a type of the hard-wired signal. In the present disclosure, when the current emergency traction information satisfies the condition of entering the emergency traction mode, the train is controlled to enter the emergency traction mode, and then, the corresponding operation is performed according to the type of the hard-wired signal from the driver controller. There is no need to arrange an emergency traction apparatus, which reduces the production costs of the train and avoids the problem that the train cannot perform emergency traction after the emergency traction apparatus fails or malfunctions. The present disclosure can effectively improve the applicability of a hard-wired control-based emergency traction circuit.

The present disclosure further provides a control method for a train to enter an emergency traction mode, applicable to a braking control system of a train. The method includes the following steps: An emergency traction hard-wired signal from a driver controller is collected. An emergency traction mode is entered when the emergency traction hard-wired signal is effective. In the control method for a train to enter an emergency traction mode according to the present disclosure, the emergency traction hard-wired signal from the driver controller is collected. Then, the emergency traction mode is entered according to the effectiveness of the emergency traction hard-wired signal. After the emergency traction mode is entered, braking or non-braking is performed according to the level of the braking hard-wired signal sent by the driver controller, which can avoid the problem that the vehicle cannot brake after the emergency traction apparatus fails or malfunctions.

The solutions of the control method for a train to enter an emergency traction mode according to the embodiments of the present disclosure are described below in detail with reference to the accompanying drawings. Features in the embodiments of the present disclosure may be mutually combined in a case that no conflict occurs.

FIG. 1 is a schematic flowchart of a control method for a train to enter an emergency traction mode according to an embodiment of the present disclosure. The method is applicable to a traction control system of a train. As shown in FIG. 1, a control method 100 for a train to enter an emergency traction mode according to an embodiment of the present disclosure may include step S101, step S102, and step S103 as follows:

Step S101. It is detected whether current emergency traction information satisfies a condition of entering an emergency traction mode.

The current emergency traction information includes: an emergency traction hard-wired signal; a rotation speed of a motor; and a hard-wired signal from a driver controller.

A driver controller, is a manual electrical appliance used by a driver to control a train. The driver controller is mainly configured to control a running direction, power, traction, and a speed of a train, is a control device in a railway train, an electric multiple unit (EMU), and industrial automation, and is also a main electrical appliance for train reversal and speed regulation.

In an example, that it is detected whether current emergency traction information satisfies the condition of entering the emergency traction mode includes the following steps:

A1. It is detected whether the emergency traction hard-wired signal is effective. A2. The motor is adjusted when the emergency traction hard-wired signal is effective, to reduce torque of the motor to 0. A3. It is detected whether the rotation speed of the motor is less than or equal to a preset threshold. A4. When the rotation speed of the motor is less than or equal to the preset threshold, it is detected whether the hard-wired signal from the driver controller is a non-traction hard-wired signal, the condition of entering the emergency traction mode being satisfied if the hard-wired signal from the driver controller is the non-traction hard-wired signal.

A conventional train traction and braking control system controls data transmission based on a network. A train control system adopts a network-first control method, with hard-wired control as backup. When communication of a train network is normal, a network control system in a train serves as a network control system that collects commands, such as a traction command and a braking command, that are issued by a train signal system and sends the commands to each carriage through the train network, to complete traction and braking of the whole train. To ensure that the train can continue to run to a next station when the network control system fails, the train is equipped with an emergency traction button. A driver can perform an operation on the emergency traction button to make the train enter the emergency traction mode. When the train is in the emergency traction mode, the traction control system and a braking control system implement traction and braking control on the train by receiving a hard-wired signal.

During running of the train, the traction and braking control system continuously detects whether the emergency traction hard-wired signal is effective. If communication of the train network is abnormal, the driver may press the emergency traction button. In this case, the emergency traction hard-wired signal becomes effective, indicating that it is needed to control the train to enter the emergency traction mode.

Generally, the hard-wired signal is directly connected to a pin (PIN) of a chip, and high-level and low-level signals are transmitted. In this embodiment, when the emergency traction hard-wired signal is a high level, the emergency traction hard-wired signal is effective.

When the traction and braking control system detects that the emergency traction hard-wired signal is effective, the motor is adjusted, to reduce torque of the motor to 0. Because the torque of the motor is reduced to 0, the train loses traction, and a velocity of the train continuously decreases until the train is in a stopping or coasting state.

Then, the traction and braking control system may detect whether the rotation speed of the motor is less than or equal to a preset threshold. Because the rotation speed of the motor corresponds to the velocity, when the rotation speed of the motor is less than the preset threshold, the velocity also decreases, for example, the velocity ≤0.5 km/h.

When the velocity corresponding to the rotation speed of the motor is small enough (for example, is less than or equal to 0.5 km/h), it is detected whether the hard-wired signal from the driver controller is a non-traction hard-wired signal. The non-traction hard-wired signal includes at least one of a braking hard-wired signal and a coasting hard-wired signal. That is, before entering the emergency traction mode, the train should be in a non-traction state.

The traction control system includes a traction inverter.

Step S102. When the current emergency traction information satisfies the condition of entering the emergency traction mode, a train is controlled to enter the emergency traction mode.

When the train is in the emergency traction mode, the traction control system tows the train according to a hard-wired signal sent by the driver controller, and is no longer controlled by a network control signal sent by the network control system.

Step S103. The hard-wired signal sent by the driver controller is received, and a corresponding operation is performed according to a type of the hard-wired signal.

The type of the hard-wired signal includes at least one of the following: an emergency traction hard-wired signal, a key hard-wired signal, a direction hard-wired signal, and a traction hard-wired signal.

In an example, that the corresponding operation is performed according to the type of the hard-wired signal includes the following step: When the hard-wired signal is the traction hard-wired signal and the emergency traction hard-wired signal, if both the traction hard-wired signal and the emergency traction hard-wired signal are effective, the train is towed according to a preset load and a preset grade.

Generally, the train is equipped with a load sensor. When the train is in the emergency traction mode, the train is no longer towed according to an actual load and instead, is towed according to the preset load. For example, the preset load is 3000 people. The preset load may be a default load set when the train is delivered from the factory or may be set according to actual needs.

Generally, the grade of the train includes four grades, namely, AW0, AW1, AW2, and AW3. AW0 means empty, AW1 means full, AW2 means fully loaded, and AW3 means overloaded. For example, the preset grade is AW1.

It should be noted that after the train enters the emergency traction mode, it is also detected in real time whether the emergency traction hard-wired signal is effective. Only when the emergency traction hard-wired signal is effective, the train is towed according to the traction hard-wired signal based on the preset load and the preset grade. If after the train enters the emergency traction mode, it is detected that the emergency traction hard-wired signal is ineffective, the train exits the emergency traction mode.

The driver controller includes a front driver controller and a rear driver controller. When the train is running on rails, the running of the train may be controlled by the front driver controller. When the train needs to be reversed, the running of the train is controlled by the rear driver controller.

In an example, that the corresponding operation is performed according to the type of the hard-wired signal includes the following steps: B1. When the hard-wired signal includes the key hard-wired signal and the direction hard-wired signal, it is determined whether the key hard-wired signal is from the front driver controller. If the key hard-wired signal is from the front driver controller, step B2 is performed. Otherwise, step B3 is performed. B2. Traction is performed according to an orientation of the front and the direction hard-wired signal. B3. Otherwise, traction is performed according to an orientation of the rear and the direction hard-wired signal.

For example, when the key hard-wired signal is from the front driver controller, it indicates that the front driver controller controls the running of the train, and the orientation of the front is consistent with a forward direction of the train. If the direction hard-wired signal is a high level, indicating forward traction, the traction control system controls the train for forward traction with the orientation of the front as a reference. If the direction hard-wired signal is a low level, indicating backward traction, the traction control system controls the train for backward traction. When the key hard-wired signal is from the rear driver controller, it indicates that the rear driver controller controls the running of the train, and the orientation of the rear is consistent with a forward direction of the train. If the direction hard-wired signal is a high level, indicating forward traction, the traction control system controls the train for traction with the orientation of the rear as a reference. If the direction hard-wired signal is a low level, indicating backward traction, the traction control system controls the train for backward traction.

In the present disclosure, when the current emergency traction information satisfies the condition of entering the emergency traction mode, the train is controlled to enter the emergency traction mode, and then, the corresponding operation is performed according to the type of the hard-wired signal from the driver controller. There is no need to arrange an emergency traction apparatus, which reduces the production costs of the train and avoids the problem that the train cannot perform emergency traction after the emergency traction apparatus fails or malfunctions and the problem that the emergency traction apparatus cannot control the braking system. The present disclosure can effectively improve the applicability of a hard-wired control-based emergency traction circuit.

Figure 2:
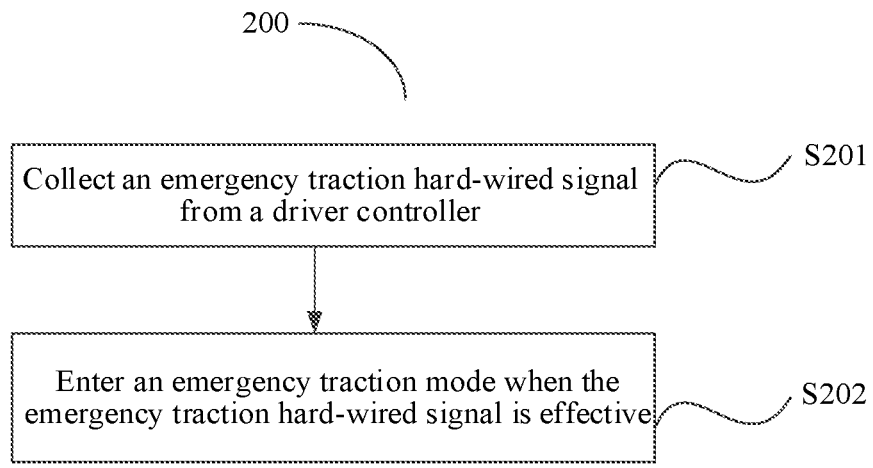
FIG. 2 is a schematic flowchart of a control method for a train to enter an emergency traction mode according to an embodiment of the present disclosure.

FIG. 2 is a schematic flowchart of a control method for a train to enter an emergency traction mode according to an embodiment of the present disclosure. The method is applicable to a braking control system of a train. As shown in FIG. 2, a control method 200 for a train to enter an emergency traction mode according to an embodiment of the present disclosure may include step S201 and step S202 as follows:

Step S101. An emergency traction hard-wired signal from a driver controller is collected.

The braking control system includes a braking controller.

In this embodiment of the present disclosure, the braking control system continuously collects emergency traction hard-wired signals from the driver controller. According to the description of the foregoing embodiment, when the emergency traction hard-wired signal is a high level, the emergency traction hard-wired signal is effective.

For a method of detecting whether the emergency traction hard-wired signal is effective, reference may be made to the description of the foregoing embodiment.

Step S102. An emergency traction mode is entered when the emergency traction hard-wired signal is effective.

The hard-wired signal includes a braking hard-wired signal.

In an example, when the emergency traction hard-wired signal is effective, after the emergency traction mode is entered, the method further includes the following steps: C1. A braking hard-wired signal sent by a driver controller is received. C2. When the braking hard-wired signal is effective, braking is performed according to a preset load and a preset grade.

For descriptions of the preset load and the preset grade, reference may be made to the description of the foregoing embodiment.

In the control method for a train to enter an emergency traction mode according to the present disclosure, the emergency traction hard-wired signal from the driver controller is collected. Then, the emergency traction mode is entered according to the effectiveness of the emergency traction hard-wired signal. After the emergency traction mode is entered, braking or non-braking is performed according to the level of the braking hard-wired signal sent by the driver controller, which can avoid the problem that the vehicle cannot brake after the emergency traction apparatus fails or malfunctions.

Figure 4:
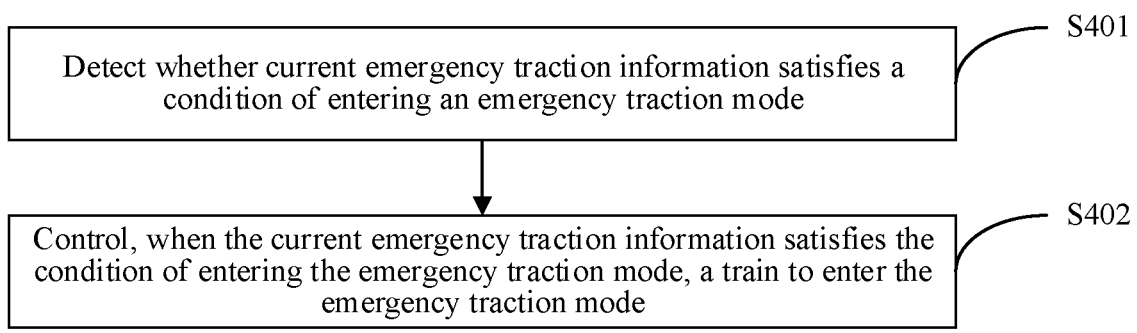
FIG. 4 is a schematic flowchart of a control method for a train to enter an emergency traction mode according to an embodiment of the present disclosure.

FIG. 4 is a flowchart of a control method for a train to enter an emergency traction mode according to an embodiment of the present disclosure.

As shown in FIG. 4, a control method for a train to enter an emergency traction mode according to this embodiment of the present disclosure may include following steps:

S401. It is detected whether current emergency traction information satisfies a condition of entering an emergency traction mode.

S402. When the current emergency traction information satisfies the condition of entering the emergency traction mode, a train is controlled to enter the emergency traction mode.

In some embodiments of the present disclosure, the current emergency traction information includes an emergency traction hard-wired signal. That it is detected whether current emergency traction information satisfies the condition of entering the emergency traction mode includes the following steps: When the emergency traction hard-wired signal is effective, a braking control system is controlled to enter the emergency traction mode. When the emergency traction hard-wired signal is effective, a traction control system is controlled to enter the emergency traction mode.

In some embodiments of the present disclosure, the current emergency traction information further includes a rotation speed of a motor and a hard-wired signal from a driver controller. Before the traction control system is controlled to enter the emergency traction mode, the method further includes the following steps: The motor is adjusted when the emergency traction hard-wired signal is effective, to reduce torque of the motor to 0. When it is detected that the rotation speed of the motor is less than or equal to a preset threshold, and the hard-wired signal from the driver controller is a non-traction hard-wired signal, the traction control system is controlled to enter the emergency traction mode.

In some embodiments of the present disclosure, the non-traction hard-wired signal includes at least one of a braking hard-wired signal and a coasting hard-wired signal.

In some embodiments of the present disclosure, after the train is controlled to enter the emergency traction mode, the method further includes the following steps: A hard-wired signal sent by a driver controller is received. A corresponding operation is performed according to a type of the hard-wired signal.

In some embodiments of the present disclosure, the type of the hard-wired signal from the driver controller includes an emergency traction hard-wired signal and a traction hard-wired signal. That the corresponding operation is performed according to the type of the hard-wired signal includes the following step: When the hard-wired signal is the traction hard-wired signal and the emergency traction hard-wired signal, if both the traction hard-wired signal and the emergency traction hard-wired signal are effective, the traction control system is controlled to tow the train according to a preset load and a preset grade.

In some embodiments of the present disclosure, the type of the hard-wired signal from the driver controller includes a key hard-wired signal and a direction hard-wired signal. That the corresponding operation is performed according to the type of the hard-wired signal includes the following steps: When the hard-wired signal includes the key hard-wired signal and the direction hard-wired signal, it is determined whether the key hard-wired signal is from a front driver controller. If the key hard-wired signal is from the front driver controller, the traction control system is controlled to perform traction according to an orientation of the front and the direction hard-wired signal. Otherwise, the traction control system is controlled to perform traction according to an orientation of the rear and the direction hard-wired signal.

In some embodiments of the present disclosure, the type of the hard-wired signal from the driver controller includes an emergency traction hard-wired signal and a braking hard-wired signal. That the corresponding operation is performed according to the type of the hard-wired signal includes the following step: When both the braking hard-wired signal and the emergency traction hard-wired signal are effective, the braking control system is controlled to perform braking according to a preset load and a preset grade.

Specifically, when the emergency traction signal is received, it is determined whether the emergency traction signal is a high-level signal. If the emergency traction signal is a high-level signal, the braking control system is controlled to enter the emergency traction mode. Because the traction control system needs to ensure that the train is almost completely stationary, and only then, it can be determined that the emergency traction mode needs to be entered, when it is determined that the emergency traction signal is effective (for example, a high level signal), the motor is adjusted first, to reduce the torque of the motor to 0, and the rotation speed of the motor is obtained in real time. When the rotation speed of the motor is less than or equal to a preset threshold (for example, 0.5 km/h), the velocity of the train is considered to be close to 0. In this case, it also needs to determine whether the traction signal from the driver controller is a non-traction hard-wired signal, for example, a braking hard-wired signal or a coasting hard-wired signal. If the traction signal from the driver controller is a non-traction hard-wired signal, it can be determined that the vehicle will not move forward due to inertia. In this case, the traction control system is controlled to enter the emergency traction mode.

When the braking control system enters the emergency traction mode, braking control is performed on the train according to the hard-wired signal from the driver controller. For example, when the hard-wired signal is a braking hard-wired signal, if the emergency traction signal still remains effective, the braking control system is controlled to perform braking according to the preset load and the preset grade.

When the traction control system enters the emergency traction mode, traction control is performed on the train according to the hard-wired signal from the driver controller. For example, when the hard-wired signal is a traction hard-wired signal, if the traction hard-wired signal still remains effective, the traction control system is controlled to perform traction according to the preset load and the preset grade. In another example, when the hard-wired signal is the key hard-wired signal and the direction hard-wired signal, if the emergency traction signal still remains effective, it is determined whether the key hard-wired signal is from the front driver controller. If the key hard-wired signal is from the front, the traction control system is controlled to perform traction according to an orientation of the front and the direction hard-wired signal. Otherwise, the traction control system is controlled to perform traction according to an orientation of the rear and the direction hard-wired signal.

In the control method for a train to enter an emergency traction mode according to the present disclosure, it can be determined according to different conditions whether the braking control system and the traction control system of the vehicle enter the emergency traction mode, and the braking control system and the traction control system are controlled according to the hard-wired signal from the driver controller to execute corresponding control policies.

Figure 3:
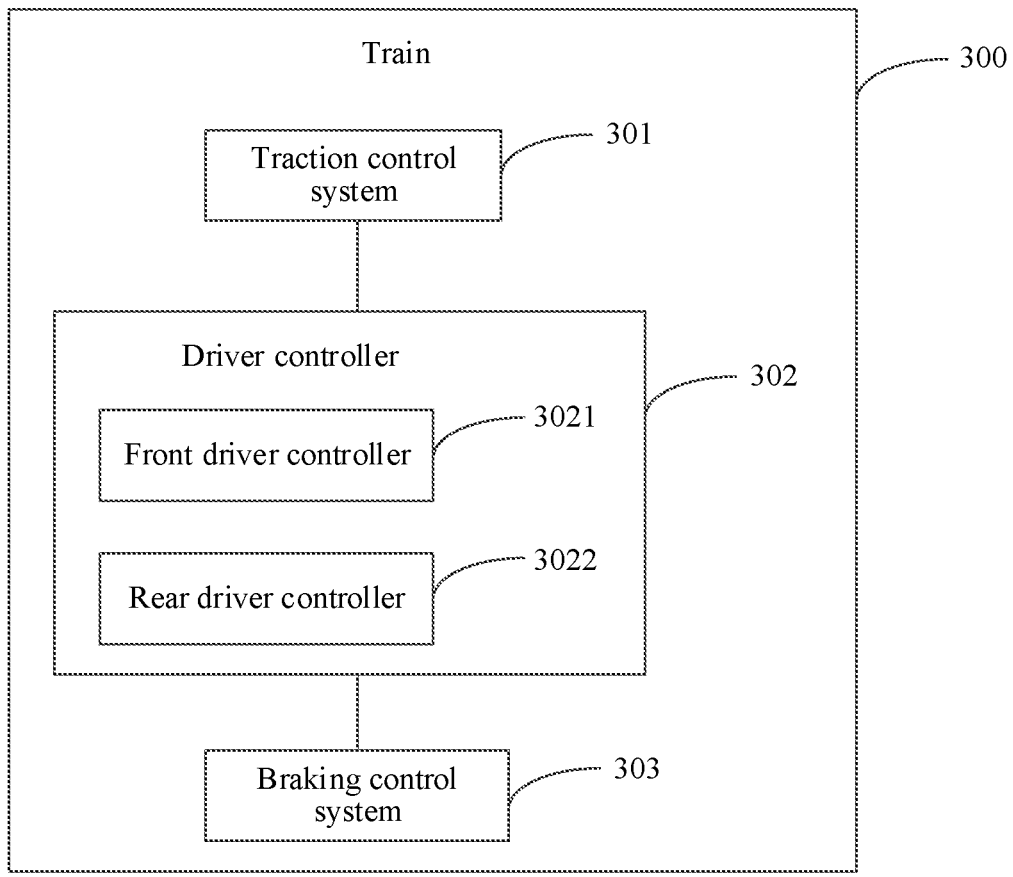
FIG. 3 is a schematic block diagram of a train according to an embodiment of the present disclosure.

A train according to the present disclosure is described below with reference to FIG. 3. FIG. 3 is a schematic block diagram of a train 300 according to an embodiment of the present disclosure.

As shown in FIG. 3, the train 300 includes a traction control system 301, a driver controller 302, and a braking control system 303. The driver controller 302 includes a front driver controller 3021 and a rear driver controller 3022.

The traction control system 301 is configured to:
  detect whether current emergency traction information satisfies a condition of entering an emergency traction mode;
  control, when the current emergency traction information satisfies the condition of entering the emergency traction mode, the train 300 to enter the emergency traction mode; and
  receive a hard-wired signal sent by the driver controller 302, and perform a corresponding operation according to a type of the hard-wired signal.

The braking control system 303 is configured to:
  collect an emergency traction hard-wired signal from the driver controller 302; and
  enter the emergency traction mode when the emergency traction hard-wired signal is effective.

The driver controller 302 includes the front driver controller 3021 and the rear driver controller 3022. The traction control system 301 includes a traction inverter. The braking control system 303 includes a braking controller.

In some embodiments of the present disclosure, the current emergency traction information includes the emergency traction hard-wired signal, a rotation speed of a motor, and a hard-wired signal from the driver controller. The traction control system 301 detects whether the current emergency traction information satisfies the condition of entering the emergency traction mode and is specifically configured to:
  adjust the motor when the emergency traction hard-wired signal is effective, to reduce torque of the motor to 0; and
  enter the emergency traction mode when detecting that the rotation speed of the motor is less than or equal to a preset threshold, and the hard-wired signal from the driver controller is a non-traction hard-wired signal.

The non-traction hard-wired signal includes at least one of a braking hard-wired signal and a coasting hard-wired signal.

In some embodiments of the present disclosure, the type of the hard-wired signal from the driver controller includes an emergency traction hard-wired signal, a traction hard-wired signal, a key hard-wired signal, and a direction hard-wired signal. The traction control system 301 performs the corresponding operation according to the type of the hard-wired signal and is specifically configured to:
  tow, when the hard-wired signal is the traction hard-wired signal and the emergency traction hard-wired signal, the train according to a preset load and a preset grade if both the traction hard-wired signal and the emergency traction hard-wired signal are effective;
  determine, when the hard-wired signal includes the key hard-wired signal and the direction hard-wired signal, whether the key hard-wired signal is from the front driver controller; and perform traction according to an orientation of the front and the direction hard-wired signal if the key hard-wired signal is from the front driver controller; otherwise, perform traction according to an orientation of the rear and the direction hard-wired signal.

In some embodiments of the present disclosure, the type of the hard-wired signal from the driver controller includes an emergency traction hard-wired signal and a braking hard-wired signal. The braking control system 303 is further configured to:

perform braking according to a preset load and a preset grade when both the braking hard-wired signal and the emergency traction hard-wired signal are effective.

Because the train according to this embodiment of the present disclosure can implement the foregoing control method for a train to enter an emergency traction mode, the train has advantages the same as those of the foregoing method.

Although exemplary embodiments have been described with reference to accompanying drawings, it should be understood that the above exemplary embodiments are only illustrative, and not intended to limit the scope of the present disclosure thereto. Various changes and modifications can be made by a person of ordinary skill in the art without departing from the scope and spirit of the present disclosure. All these changes and modifications are intended to be embraced in the scope of the present disclosure as defined in the appended claims.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but such implementation is not to be considered beyond the scope of the present disclosure.

In the several embodiments provided in the present disclosure, it should be understood that the disclosed device and method may be implemented in other manners. For example, the described device embodiments are merely examples. For example, the unit division is merely logical function division and may be other division during actual implementation. For example, multiple units or components may be combined or integrated into another device, or some features may be ignored or not performed.

In the specification provided herein, many specific details are provided. However, it should be understood that the embodiments of the present disclosure may be practiced without such specific details. In some examples, well-known methods, structures, and technologies are not shown in detail so as not to obscure the understanding of the specification.

Similarly, it should be understood that to simplify the present disclosure and help to understand one or more of disclosure aspects, in the descriptions of the exemplary embodiments of the present disclosure, features of the present disclosure are sometimes grouped into a single embodiment or figure, or descriptions thereof. However, the methods in the present disclosure should not be construed as reflecting the following intention: that is, the present disclosure claimed to be protected is required to have more features than those clearly set forth in each claim. More definitely, as reflected in the corresponding claims, the inventiveness of the disclosure lies in resolving the corresponding technical problem using features less than all features of a single embodiment disclosed above. Therefore, the claims complying with a specific implementation are hereby explicitly incorporated into the specific implementation. Each claim is a separate embodiment of the present disclosure.

A person skilled in the art may understand that, all features disclosed in this specification (including the appended claims, abstract and drawings), and all processes or units of any method or device disclosed herein may be combined in any combination, unless features are mutually exclusive. Unless otherwise expressly stated, each of the feature disclosed in this specification (including the appended claims, abstract, and accompanying drawings) may be replaced with an alternative feature that achieves the same, equivalent or similar purpose.

In addition, a person skilled in the art can understand that, although some embodiments herein include some but not other features included in other embodiments, combinations of features of different embodiments are meant to be within the scope of the present disclosure and to form different embodiments. For example, in the claims, any one of the claimed embodiments may be used in any combination.

The various component embodiments of the present disclosure may be implemented in hardware or in software modules running on one or more processors or in a combination thereof. A person skilled in the art should understand that a microprocessor or a digital signal processor (DSP) may be used in practice to implement some or all of the functions of some components according to the embodiments of the present disclosure. The present disclosure may alternatively be implemented as an apparatus program (for example, a computer program and a computer program product) for performing part or all of the methods described herein. Such a program that implements the present disclosure may be stored on a computer-readable medium or may be in the form of one or more signals. Such signals may be downloaded from Internet websites, provided on carrier signals, or provided in any other form.

It should be noted that the above-mentioned embodiments illustrate rather than limit the present disclosure, and a person skilled in the art may devise alternative embodiments without departing from the scope of the appended claims. In the claims, any reference sign between parentheses shall not be construed as limiting the claims. The word "include" does not exclude the presence of elements or steps not listed in the claims. The word "a" or "an" preceding an element does not exclude the presence of multiple such elements. The present disclosure may be implemented through hardware including different elements and a suitably programmed computer. In the unit claims enumerating several apparatuses, several of these apparatuses can be specifically embodied by the same item of hardware. The use of the words such as "first", "second", "third", and the like does not denote any order. Such terms may be interpreted as names.

The foregoing descriptions are merely specific implementations of the present disclosure or descriptions of the specific implementations, but are not intended to limit the protection scope of the present disclosure. Any variation or replacement readily figured out by a person skilled in the art within the technical scope disclosed in the present disclosure shall fall within the protection scope of the present disclosure. The protection scope of the present disclosure shall be subject to the protection scope of the claims.

What is claimed is:

1. A control method for a train to enter an emergency traction mode, comprising:
   detecting current emergency traction information;

controlling, in response to the current emergency traction information satisfying a condition of entering an emergency traction mode, the train to enter the emergency traction mode; and receiving a hard-wired signal sent by a driver controller, and performing a corresponding operation according to a type of the hard-wired signal, wherein the current emergency traction information comprises:
   an emergency traction hard-wired signal;
   a rotation speed of a motor; and
   a hard-wired signal from the driver controller;

wherein the hard-wired signal from the driver controller comprises a non-traction hard-wired signal, and the detecting whether current emergency traction information satisfies a condition of entering an emergency traction mode comprises:

detecting the emergency traction hard-wired signal;
adjusting the motor in response to the emergency traction hard-wired signal being effective, to reduce torque of the motor to 0;
detecting the rotation speed of the motor; and
detecting, in response to the rotation speed of the motor being less than or equal to a preset threshold, the condition of entering the emergency traction mode being satisfied in response to the hard-wired signal from the driver controller being the non-traction hard-wired signal.

2. The method according to claim 1, wherein the non-traction hard-wired signal comprises at least one of a braking hard-wired signal and a coasting hard-wired signal.

3. The method according to claim 1, wherein a type of the hard-wired signal from the driver controller comprises at least one of the following: an emergency traction hard-wired signal, a key hard-wired signal, a direction hard-wired signal, and a traction hard-wired signal.

4. The method according to claim 3, wherein the performing a corresponding operation according to a type of the hard-wired signal comprises:
   towing, in response to the hard-wired signal being the traction hard-wired signal and the emergency traction hard-wired signal and both being effective, the train according to a preset load and a preset grade.

5. The method according to claim 3, wherein the driver controller comprises a front driver controller and a rear driver controller; and
   the performing a corresponding operation according to a type of the hard-wired signal comprises;
   performing traction according to an orientation of the front and the direction hard-wired signal in response to the hard-wired signal comprising the key hard-wired signal and the direction hard-wired signal and the key hard-wired signal being from the front driver controller; otherwise, performing traction according to an orientation of the rear and the direction hard-wired signal.

6. The method according to claim 1, wherein the traction control system comprises a traction inverter.

7. A control method for a train to enter an emergency traction mode, comprising:
   detecting current emergency traction information; and
   controlling, in response to the current emergency traction information satisfying the condition of entering the emergency traction mode, a train to enter the emergency traction mode;

wherein the current emergency traction information comprises an emergency traction hard-wired signal, and the detecting current emergency traction information comprises:
   controlling, in response to the emergency traction hard-wired signal being effective, a braking control system to enter the emergency traction mode; or
   controlling, in response to the emergency traction hard-wired signal being effective, a traction control system to enter the emergency traction mode;
   and wherein the current emergency traction information further comprises a rotation speed of a motor and a hard-wired signal from a driver controller, and before controlling the traction control system to enter the emergency traction mode, the method further comprises:
   adjusting the motor in response to the emergency traction hard-wired signal being effective, to reduce torque of the motor to 0; and
   controlling in response to detecting that the rotation speed of the motor being less than or equal to a preset threshold, and the hard-wired signal from the driver controller being a non-traction hard-wired signal, the traction control system to enter the emergency traction mode.

8. The method according to claim 7, wherein the non-traction hard-wired signal comprises at least one of a braking hard-wired signal and a coasting hard-wired signal.

9. The method according to claim 7, after the controlling a train to enter the emergency traction mode, the method further comprising:
   receiving a hard-wired signal sent by the driver controller; and
   performing a corresponding operation according to a type of the hard-wired signal.

10. The method according to claim 9, wherein the type of the hard-wired signal from the driver controller comprises an emergency traction hard-wired signal and a traction hard-wired signal, and the performing a corresponding operation according to a type of the hard-wired signal comprises:
   controlling, in response to the hard-wired signal being the traction hard-wired signal and the emergency traction hard-wired signal and both being effective, the traction control system to tow the train according to a preset load and a preset grade.

11. The method according to claim 9, wherein the type of the hard-wired signal from the driver controller comprises a key hard-wired signal and a direction hard-wired signal, and the performing a corresponding operation according to a type of the hard-wired signal comprises:
   determining, in response to the hard-wired signal comprising the key hard-wired signal and the direction hard-wired signal, whether the key hard-wired signal is from a front driver controller; and
   controlling, in response to the key hard-wired signal being from the front driver controller, the traction control system to perform traction according to an orientation of the front and the direction hard-wired signal; otherwise, controlling the traction control system to perform traction according to an orientation of the rear and the direction hard-wired signal.

12. The method according to claim 9, wherein the type of the hard-wired signal from the driver controller comprises an emergency traction hard-wired signal and a braking hard-wired signal, and the performing a corresponding operation according to a type of the hard-wired signal comprises:
controlling, in response to both the braking hard-wired signal and the emergency traction hard-wired signal being effective, the braking control system to perform braking according to a preset load and a preset grade.

13. A train, comprising a traction control system, a driver controller, and a braking control system,
wherein the traction control system is configured to:
detect whether current emergency traction information satisfies a condition of entering an emergency traction mode;
control, in response to the current emergency traction information satisfying the condition of entering the emergency traction mode, the train to enter the emergency traction mode; and
receive a hard-wired signal sent by the driver controller, and perform a corresponding operation according to a type of the hard-wired signal; and
wherein the braking control system is configured to:
collect an emergency traction hard-wired signal from the driver controller;
enter the emergency traction mode in response to the emergency traction hard-wired signal being effective; and
wherein the driver controller comprises a front driver controller and a rear driver controller, the traction control system comprising a traction inverter, and the braking control system comprising a braking controller;
wherein the current emergency traction information comprises the emergency traction hard-wired signal, a rotation speed of a motor, and a hard-wired signal from the driver controller, and the traction control system detects whether the current emergency traction information satisfies the condition of entering the emergency traction mode and is specifically configured to:
adjust the motor in response to the emergency traction hard-wired signal being effective, to reduce torque of the motor to 0; and
enter the emergency traction mode in response to detecting that the rotation speed of the motor is less than or equal to a preset threshold, and the hard-wired signal from the driver controller is a non-traction hard-wired signal,
the non-traction hard-wired signal comprising at least one of a braking hard-wired signal and a coasting hard-wired signal.

14. The train according to claim 13, wherein the type of the hard-wired signal from the driver controller comprises an emergency traction hard-wired signal, a traction hard-wired signal, a key hard-wired signal, and a direction hard-wired signal, and the traction control system performs the corresponding operation according to the type of the hard-wired signal and is specifically configured to:
tow, in response to the hard-wired signal being the traction hard-wired signal and the emergency traction hard-wired signal and both being effective, the train according to a preset load and a preset grade;
determine, in response to the hard-wired signal comprising the key hard-wired signal and the direction hard-wired signal, whether the key hard-wired signal is from the front driver controller; and
perform traction according to an orientation of the front and the direction hard-wired signal in response to the key hard-wired signal being from the front driver controller; otherwise, perform traction according to an orientation of the rear and the direction hard-wired signal.

15. The train according to claim 13, wherein the type of the hard-wired signal from the driver controller comprises an emergency traction hard-wired signal and a braking hard-wired signal, and the braking control system is further configured to:
perform braking according to a preset load and a preset grade in response to both the braking hard-wired signal and the emergency traction hard-wired signal being effective.

* * * * *